(12) United States Patent
Pan (10) Patent No.: US 10,503,966 B1
(45) Date of Patent: Dec. 10, 2019

(54) BINOCULAR PEDESTRIAN DETECTION SYSTEM HAVING DUAL-STREAM DEEP LEARNING NEURAL NETWORK AND THE METHODS OF USING THE SAME

(71) Applicant: TINDEI NETWORK TECHNOLOGY (SHANGHAI) CO., LTD., Shanghai (CN)

(72) Inventor: Zixiao Pan, Shanghai (CN)

(73) Assignee: TINDEI NETWORK TECHNOLOGY (SHANGHAI) CO., LTD., Shanghai (CN)

(*) Notice: Subject to any disclaimer, the term of this patent is extended or adjusted under 35 U.S.C. 154(b) by 0 days.

(21) Appl. No.: 16/157,173

(22) Filed: Oct. 11, 2018

(51) Int. Cl.
*G06K 9/00* (2006.01)
*G06N 3/08* (2006.01)
(Continued)

(52) U.S. Cl.
CPC ....... *G06K 9/00342* (2013.01); *G06K 9/6256* (2013.01); *G06K 9/6262* (2013.01); *G06N 3/04* (2013.01); *G06N 3/08* (2013.01); *G06T 7/593* (2017.01); *H04N 13/239* (2018.05); *H04N 13/271* (2018.05); *G06T 2207/10012* (2013.01); *G06T 2207/10021* (2013.01); *G06T 2207/20081* (2013.01); *G06T 2207/20084* (2013.01);
(Continued)

(58) Field of Classification Search
CPC ............ G06K 9/00342; G06K 9/6256; G06K 9/6262; G06N 3/04; G06N 3/08; H04N 13/239; H04N 13/271; H04N 2013/0081; G06T 7/593; G06T 2207/20084; G06T 2207/20081; G06T 2207/10021; G06T 2207/30196; G06T 2207/10012
See application file for complete search history.

(56) References Cited

U.S. PATENT DOCUMENTS

| 2005/0201591 | A1* | 9/2005 | Kiselewich | ........ G06K 9/00369 382/104 |
| 2012/0134574 | A1* | 5/2012 | Takahashi | ............... G06T 5/009 382/154 |

(Continued)

*Primary Examiner* — Tracy Y. Li
(74) *Attorney, Agent, or Firm* — Ming Jiang; MM IP Services LLC (57) ABSTRACT

Aspects of present disclosure relates to a binocular pedestrian detection system (BPDS). BPDS includes: a binocular camera to capture certain binocular images of pedestrians passing through a predetermined area, an image/video processing ASIC to process binocular images captured, and a binocular pedestrian detection system controller having a processor, a network interface, and a memory storing computer executable instructions. When executed by processor, computer executable instructions cause processor to perform: capturing, by binocular camera, binocular images of pedestrians, binocularly rectifying binocular images, calculating disparity maps of binocular images rectified, training a dual-stream deep learning neural network, and detecting pedestrians passing through predetermined area using dual-stream deep learning neural network trained. Dual-stream deep learning neural network includes a neural network for extracting disparity features from disparity maps of binocular images, and a neural network for learning and fusing features from rectified left images and disparity maps of binocular images.

20 Claims, 8 Drawing Sheets

(51) Int. Cl.
*G06N 3/04* (2006.01)
*H04N 13/239* (2018.01)
*G06K 9/62* (2006.01)
*G06T 7/593* (2017.01)
*H04N 13/271* (2018.01)
*H04N 13/00* (2018.01)

(52) U.S. Cl.
CPC ............ *G06T 2207/30196* (2013.01); *H04N 2013/0081* (2013.01)

(56) References Cited

U.S. PATENT DOCUMENTS

2014/0365644 A1* 12/2014 Tanaka .................... H04L 67/12
 709/224
2019/0026917 A1* 1/2019 Liao .......................... G06T 7/73

\* cited by examiner

BINOCULAR PEDESTRIAN DETECTION SYSTEM HAVING DUAL-STREAM DEEP LEARNING NEURAL NETWORK AND THE METHODS OF USING THE SAME

FIELD

The present disclosure generally relates to pedestrian detection, and more particularly to a binocular pedestrian detection system having dual-stream deep learning neural network and methods of using the binocular pedestrian detection system having dual-stream deep learning neural network.

BACKGROUND

Pedestrian detection plays a key role in video surveillance and pedestrian counting in a defined area, such as a store, a street, or a sports stadium. A number of methods may be used to detect pedestrians: (a) Monocular Video Pedestrian detection based on single frame picture, (b) Monocular Video Pedestrian detection based on frame motion information; (c) Pedestrian detection based on binocular vision, and (d) Pedestrian detection using 3D data acquisition system etc. Method (a) only utilizes the color and texture information of monocular RGB images. For targets difficult to be distinguished such as shadow, footprints, or a pedestrian wearing a hat, its robustness is poor and misdetection occurs often. Method (b) extracts the motion information of pedestrians based on their edge features between subsequent frames, and the detection results and robustness are both good for pedestrians in motion. However, it is not very good for stationary pedestrians since the edge features between subsequent frames are not easy to be extracted and pedestrian detection often fails. Method (c) makes use of binocular information for more accurate pedestrian detection results. But the existing method is only to use the disparity maps to select regions of interest, pedestrian detection in the area of interest is still based on monocular RGB image characteristics. Therefore, this method can only be used to remove false pedestrian targets (such as shadows, footprints), and the detection effect of special pedestrian targets such as those wearing hats is still poor. With the help of the pedestrian detection method depending on 3D data acquisition equipment, the three-dimensional locations can be accurately determined by collecting three-dimensional information using method (d). However, this approach requires the use of additional expensive 3D data acquisition systems such as LiDAR, which is difficult to be equipped in common public places, so this method is less practical in practical scenarios.

Therefore, a heretofore unaddressed need still exists in the art to address the aforementioned deficiencies and inadequacies.

SUMMARY

In one aspect, the present disclosure relates to a binocular pedestrian detection system. In certain embodiments, the binocular pedestrian detection system includes: a binocular camera, an image/video processing application specific integrated circuit (ASIC), and a binocular pedestrian detection system controller. The binocular camera has a first camera, and a second camera to capture certain number of binocular images of pedestrians passing through a predetermined area. The first camera includes a first lens, and a first CMOS sensor for capturing a left image through the first lens. The second camera includes a second lens, and a second CMOS sensor for capturing a right image through the second lens. The left image and the right image form a binocular image. The image/video processing ASIC preprocesses the binocular images of the pedestrians captured by the binocular camera. The binocular pedestrian detection system controller includes a processor, a network interface, and a memory storing an operating system, and computer executable instructions. When the computer executable instructions are executed in the processor, the computer executable instructions cause the processor to perform one or more of following: capturing, by the binocular camera, the binocular images of the pedestrians passing through the predetermined area, binocularly rectifying, by the image/video processing ASIC, the binocular images of the pedestrians captured, calculating disparity maps of the binocular images of the pedestrians binocularly rectified, training a dual-stream deep learning neural network, and detecting, via the dual-stream deep learning neural network trained, the pedestrians passing through the predetermined area. The dual-stream deep learning neural network includes a neural network for extracting disparity features from the disparity maps of the binocular images of the pedestrians, and a neural network for learning and fusing the features of RGB and disparity from binocular images of pedestrians.

In certain embodiments, the binocular images of the pedestrians include certain training binocular images of the pedestrians and certain real-time binocular images of the pedestrians captured by the binocular camera for pedestrian detection. The image/video processing ASIC is programmed to perform: performing calibration of the binocular camera, binocularly rectifying the binocular images of the pedestrians, calculating the disparity maps of training binocular images of the pedestrians during a training phase, and calculating the disparity maps of real-time binocular images of the pedestrians during an application phase.

In certain embodiments, the training phase includes: 1) training of the neural network for extracting disparity features using the disparity maps of the binocular images of the pedestrians, 2) training of the neural network for learning RGB features and fusing the features of RGB and disparity, where the learning of RGB features is based on the left images of pedestrians only, 3) stacking the trained neural networks above to form the dual-stream deep learning neural network, and 4) finetuning of the formed dual-stream deep learning neural network using left images and disparity maps of the binocular images of the pedestrians.

In certain embodiments, the application phase includes: capturing, by the binocular camera, the real-time binocular images, binocularly rectifying, by the image/video processing ASIC, the real-time binocular images captured, calculating, by the image/video processing ASIC, disparity maps of the real-time binocular images binocularly rectified, detecting the pedestrians from the left images associated with the disparity maps of real-time binocular images using the dual-stream deep learning neural network formed during the training phase, and performing non-maximum suppression operation to detection results to obtain final pedestrian detection results.

In certain embodiments, the process of detecting pedestrians using the dual-stream deep learning neural network includes: extracting disparity features from the disparity maps of real-time binocular images based on the neural network for extracting disparity features, learning RGB features from left images using the first N layers of the neural network for learning and fusing the features of RGB and disparity, stacking the disparity features extracted and the RGB features learned through a number of channels, and fusing features of disparity and RGB using the last M−N layers of the neural network for learning and fusing features to obtain the final pedestrian detection results. In certain embodiments, N is a positive integer, and M is a positive integer greater than N and is a total number of layers of the neural network for learning and fusing features. In one embodiment, N is 7, and M is 15.

In one embodiment, the binocular pedestrian detection system is installed over a doorway having binocular camera facing down to the pedestrians passing through the doorway. In another embodiment, the binocular pedestrian detection system is installed over a doorway having binocular camera facing the pedestrians passing through the doorway in a predetermined angle.

In certain embodiments, the network interface includes a power-on-ethernet (POE) network interface. The power supply to the binocular pedestrian detection system is provided by the POE network interface, and the final pedestrian detection results are transmitted to a server that collects the final pedestrian detection results through the network interface and a communication network.

In another aspect, the present disclosure relates to a method of detecting pedestrians using a binocular pedestrian detection system. In certain embodiments, the method includes: capturing certain binocular images of pedestrians passing through a predetermined area using a binocular camera of the binocular pedestrian detection system, binocularly rectifying, via an image/video processing ASIC of the binocular pedestrian detection system, the binocular images of the pedestrians captured, calculating, via the image/video processing ASIC, disparity maps of the binocular images of the pedestrians binocularly rectified, training a dual-stream deep learning neural network using the left images and disparity maps of the binocular images of the pedestrians, and detecting, via the dual-stream deep learning neural network trained, the pedestrians passing through the predetermined area.

In certain embodiments, the dual-stream deep learning neural network includes a neural network for extracting disparity features from the disparity maps of the binocular images, and a neural network for learning RGB features and fusing the features of RGB and disparity of binocular images.

In certain embodiments, the binocular pedestrian detection system includes: the binocular camera, the image/video processing application specific integrated circuit (ASIC), and a binocular pedestrian detection system controller. The binocular camera has a first camera, and a second camera to capture certain number of binocular images of pedestrians passing through a predetermined area. The first camera includes a first lens, and a first CMOS sensor for capturing a left image through the first lens. The second camera includes a second lens, and a second CMOS sensor for capturing a right image through the second lens. The left image and the right image form a binocular image. The image/video processing ASIC preprocesses the binocular images of the pedestrians captured by the binocular camera. The binocular pedestrian detection system controller includes a processor, a network interface, and a memory storing an operating system, and computer executable instructions. When the computer executable instructions are executed in the processor, the computer executable instructions cause the processor to perform one or more operations of the method.

In certain embodiments, the binocular images of the pedestrians include certain training binocular images of the pedestrians and certain real-time binocular images of the pedestrians captured by the binocular camera for pedestrian detection. The image/video processing ASIC is programmed to perform: performing calibration of the binocular camera, binocularly rectifying the binocular images of the pedestrians, calculating the disparity maps of training binocular images of the pedestrians during a training phase, and calculating the disparity maps of real-time binocular images of the pedestrians during an application phase.

In certain embodiments, the training phase includes: training of the neural network for extracting disparity features using the disparity maps of the binocular images of the pedestrians, training of the neural network for learning and fusing the features of RGB and disparity, where the learning of RGB features is based on left images of pedestrians only, stacking the trained neural networks above to form the dual-stream deep learning neural network, and finetuning of the formed dual-stream deep learning neural network using left images and disparity maps of the binocular images of the pedestrians.

In certain embodiments, the application phase includes: capturing, by the binocular camera, the real-time binocular images of the pedestrians, binocularly rectifying, by the image/video processing ASIC, the real-time binocular images of the pedestrians captured, calculating, by the image/video processing ASIC, disparity maps of the real-time binocular images of the pedestrians binocularly rectified, detecting the pedestrians from the left images together with disparity maps of real-time binocular images using the dual-stream deep learning neural network formed during the training phase, and performing non-maximum suppression operation to detection results to obtain final pedestrian detection results.

In certain embodiments, the process of detecting pedestrians using the dual-stream deep learning neural network includes: extracting disparity features from the disparity maps of the real-time binocular images of the pedestrians using the neural network for extracting disparity features, learning RGB features from left images of pedestrians using the first N layers of the neural network for learning and fusing the features of RGB and disparity, stacking the disparity features extracted and the RGB features learned through a number of channels, and fusing features of disparity and RGB using the last M−N layers of the neural network for learning and fusing features to obtain the final pedestrian detection results. In certain embodiments, N is a positive integer, and M is a positive integer greater than N and is a total number of layers of the neural network for learning and fusing features. In one embodiment, N is 7, and M is 15.

In one embodiment, the binocular pedestrian detection system is installed over a doorway having binocular camera facing down to the pedestrians passing through the doorway. In another embodiment, the binocular pedestrian detection system is installed over a doorway having binocular camera facing the pedestrians passing through the doorway in a predetermined angle.

In certain embodiments, the network interface includes a power-on-ethernet (POE) network interface. The power supply to the binocular pedestrian detection system is provided by the POE network interface, and the final pedestrian detection results are transmitted to a server that collects the final pedestrian detection results through the network interface and a communication network.

These and other aspects of the present disclosure will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the present disclosure, and features and benefits thereof, and together with the written description, serve to explain the principles of the present invention. Wherever possible, the same reference numbers are used throughout the drawings to refer to the same or like elements of an embodiment, and wherein.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings FIGS. 1 through 9, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Figure 1:
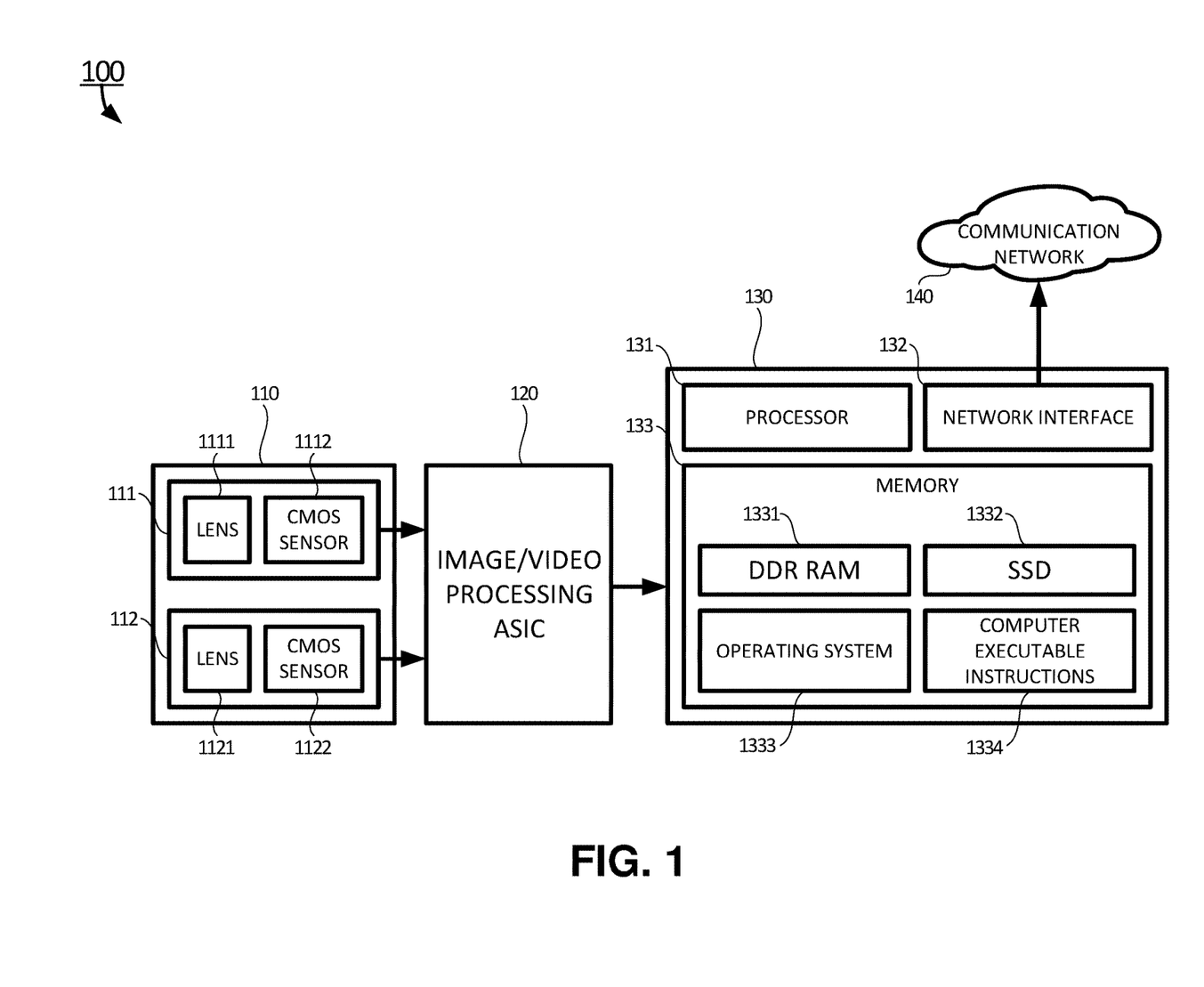
FIG. 1 shows a block diagram of a binocular pedestrian detection system having dual stream deep learning neural network according to certain embodiments of the present disclosure.
Figure 2:
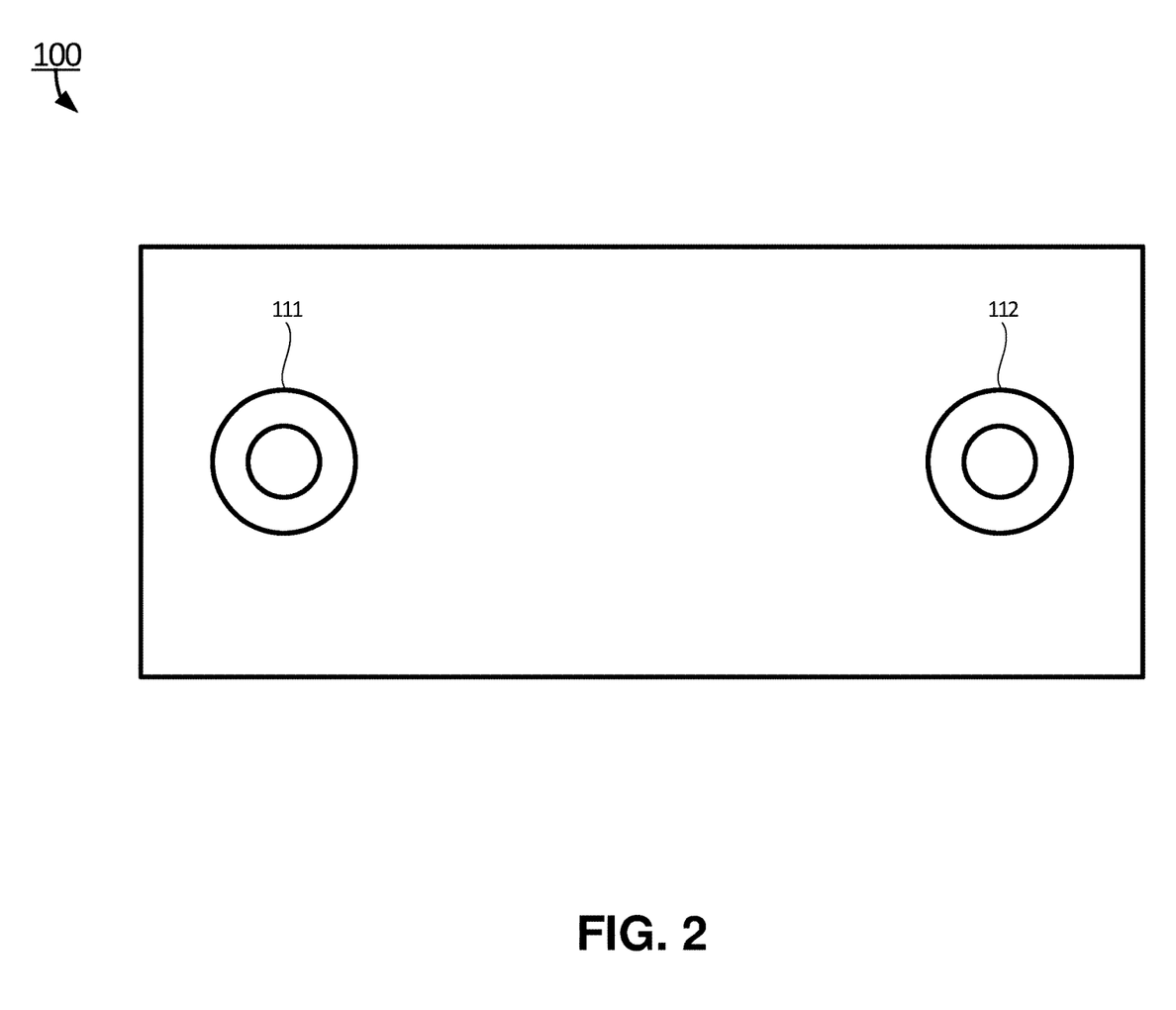
FIG. 2 illustrates a bottom view of the binocular pedestrian detection system according to certain embodiments of present disclosure.
Figure 3:
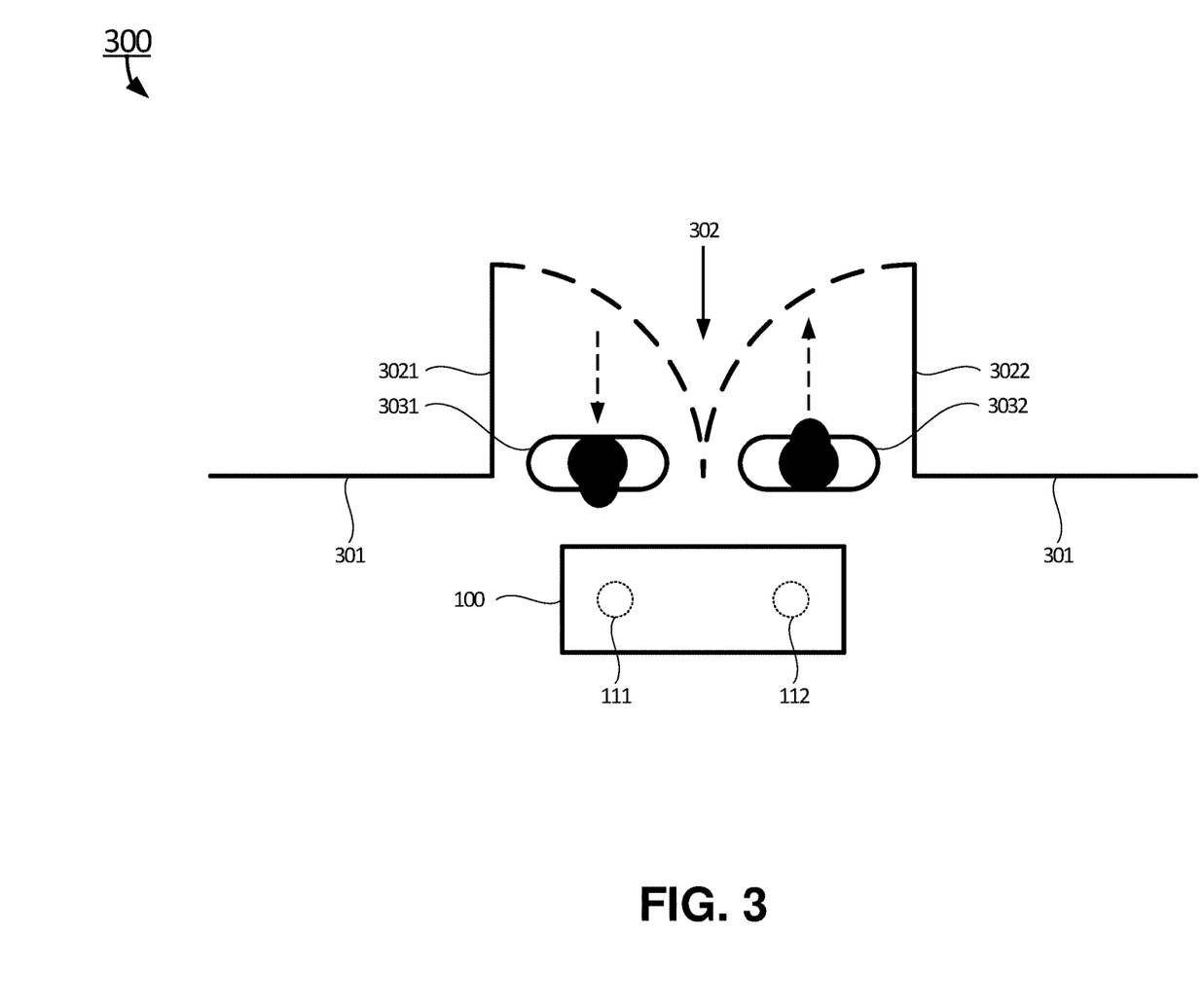
FIG. 3 illustrates the binocular pedestrian detection system installed over a doorway for detecting pedestrians walking into or out of the doorway according to certain embodiments of the present disclosure.

In one aspect, the present disclosure relates to a binocular pedestrian detection system 100 as shown in FIG. 1. In certain embodiments, the binocular pedestrian detection system 100 includes: a binocular camera 110, an image/video processing application specific integrated circuit (ASIC) 120, and a binocular pedestrian detection system controller 130. As shown in FIGS. 1 and 3, the binocular camera 110 has a first camera 111, and a second camera 112 to capture a series of binocular images of pedestrians 303 passing through a predetermined area. The first camera 111 includes a first lens 1111, and a first CMOS sensor 1112 for capturing a left image through the first lens 1111. The second camera 112 includes a second lens 1121, and a second CMOS sensor 1122 for capturing a right image through the second lens 1121. The left image and the right image form a binocular image.

In certain embodiments, the binocular pedestrian detection system 100 is installed over a doorway 302 to a closed area as illustrated in FIG. 3. The closed area includes walls 301, and the doorway 302 includes a left door 3021, and a right door 3022. When the first door 3021 and/or the second door are open, pedestrians 303 may enter or exit the closed area.

In certain embodiments, in order to count the pedestrians walking into or out of the closed area, at least one binocular pedestrian detection system 100 should be installed to accurately count the pedestrians.

In one embodiment, the binocular images of pedestrians 303 are captured in video form. In another embodiment, the binocular images of pedestrians 303 are captured in still images sampled from the video captured through the binocular camera 110. In certain embodiments, the sampling rate of the binocular video is 20 to 25 frames per second (fps). Depending on the speed of the Image/Video Processing ASIC 120 and the processor 131, the sampling rate of the binocular video may be reduced to as low as 10-14 fps with the image resolution at 320×240 pixels using mobile communication network platform.

In certain embodiments, when the closed area includes more than one doors, at least one binocular pedestrian detection system 100 should be installed over each of the doors.

In certain embodiments, when the door is unusually wide, or there is no wall 301 in a store front, more than one binocular pedestrian detection system 100 may be installed over the doorway opening to accurately count the pedestrians.

Figure 4:
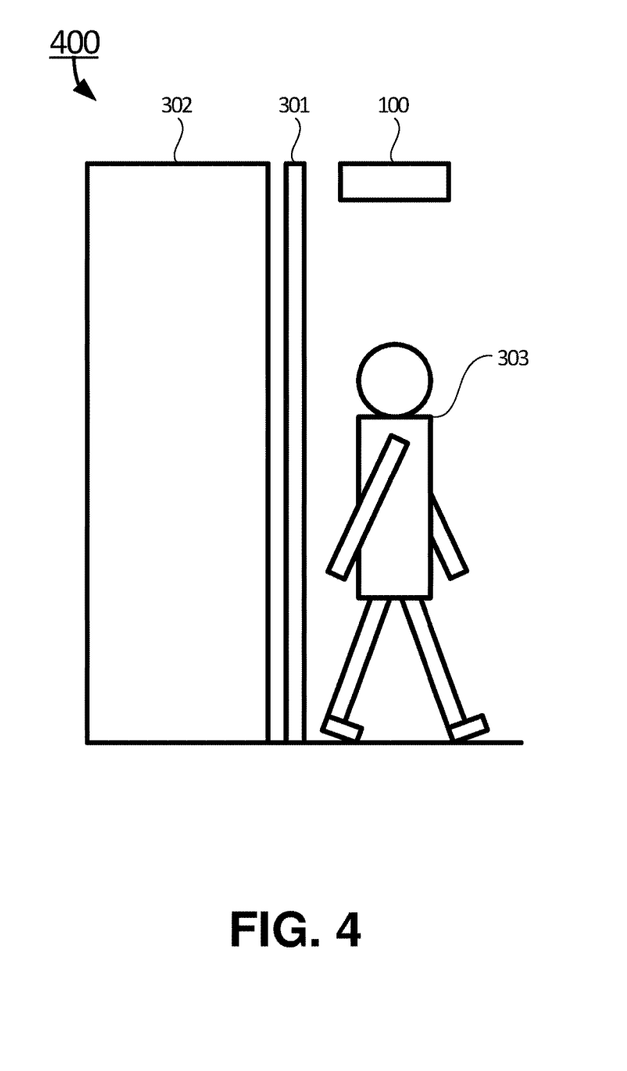
FIG. 4 illustrates the binocular pedestrian detection system installed over a doorway facing down according to certain embodiments of the present disclosure.

In one embodiment, as shown in FIG. 4, the binocular pedestrian detection system 100 may be installed directly over the entry way and directly over the pedestrian 303 and a predetermined distance from the wall 301, for example 60-80 CM from the wall 301. According to this installation, the images captured by the binocular pedestrian detection system 100 may be flat, shadows, footprints may cause pedestrian detection to fail, and accuracy of the pedestrian detection may not be ideal.

Figure 5:
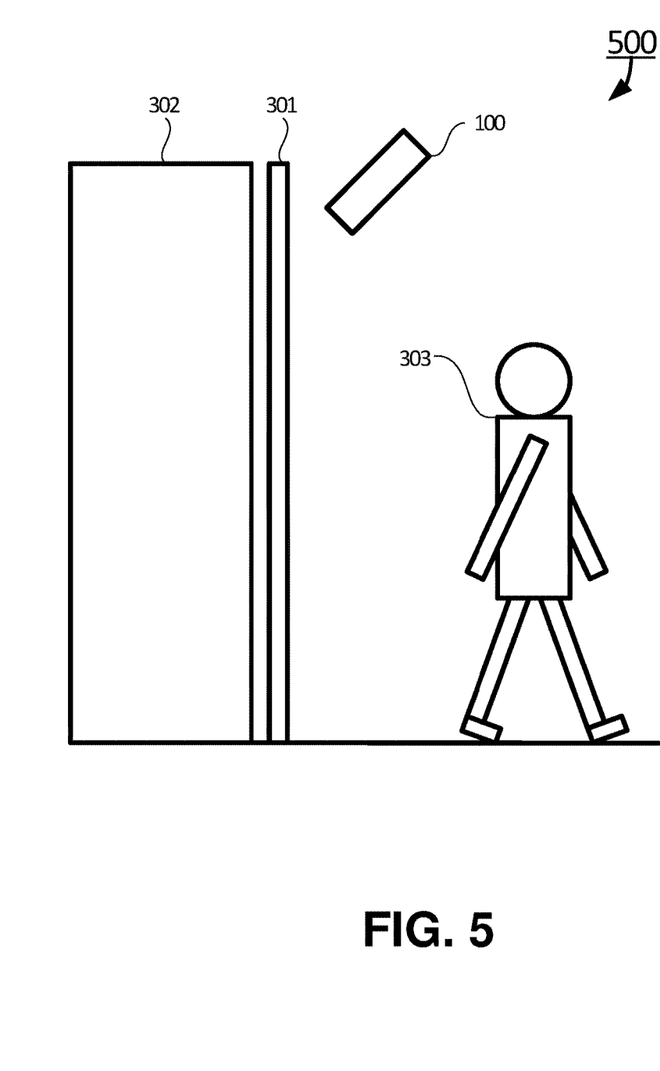
FIG. 5 illustrates the binocular pedestrian detection system installed over a doorway facing pedestrians in an angle according to certain embodiments of the present disclosure.

In another embodiment, as shown in FIG. 5, the binocular pedestrian detection system 100 may be installed in a predetermined angle over the entry way and the pedestrian 303 and a predetermined distance from the wall 301, for example 60-80 CM from the wall 301. According to this installation, the images captured by the binocular pedestrian detection system 100 may be more realistic, shadows and footprints may be distinguished from the images captured and accuracy of the pedestrian detection may be improved.

Referring back to FIG. 1, in certain embodiments, the image/video processing ASIC 120 pre-processes the binocular images of pedestrians 303 captured by the binocular camera 110. The image/video processing ASIC 120 may include a graphics processing unit (GPU) designed for doing dedicated graphics-rendering computations. The pre-process includes, among other things, binocular camera calibration, binocularly rectifying training binocular images, binocularly rectifying real-time binocular images for pedestrian detection and calculating disparity maps. The binocular pedestrian detection system controller 130 includes a processor 131, a network interface 132, and a memory 133 storing an operating system 1333, and computer executable instructions 1334. The processor 131 may include single core processor, multi-core processor, shared processor, dedicated processor, a group of processors, and artificial intelligence (AI) processor designed to handle artificial intelligence related computations.

The operating system 1333, the computer executable instructions 1334, and many parameters used in the operation of a dual-stream deep learning neural network are stored in a non-volatile solid-state drive (SSD) device 1332. When the computer executable instructions 1334 are executed in the processor 131, the computer executable instructions 1334 are loaded into one or more DDR RAM devices 1331 and cause the processor 131 to perform one or more of following: capturing, by the binocular camera 110, the binocular images of the pedestrians 303 passing through the predetermined area, binocularly rectifying, by the image/video processing ASIC 120, the binocular images of the pedestrians 303 captured, calculating disparity maps of the binocular images of the pedestrians 303 binocularly rectified, training a dual-stream deep learning neural network 625, and detecting, via the dual-stream deep learning neural network 625 trained, the pedestrians 303 passing through the predetermined area.

Figure 6:
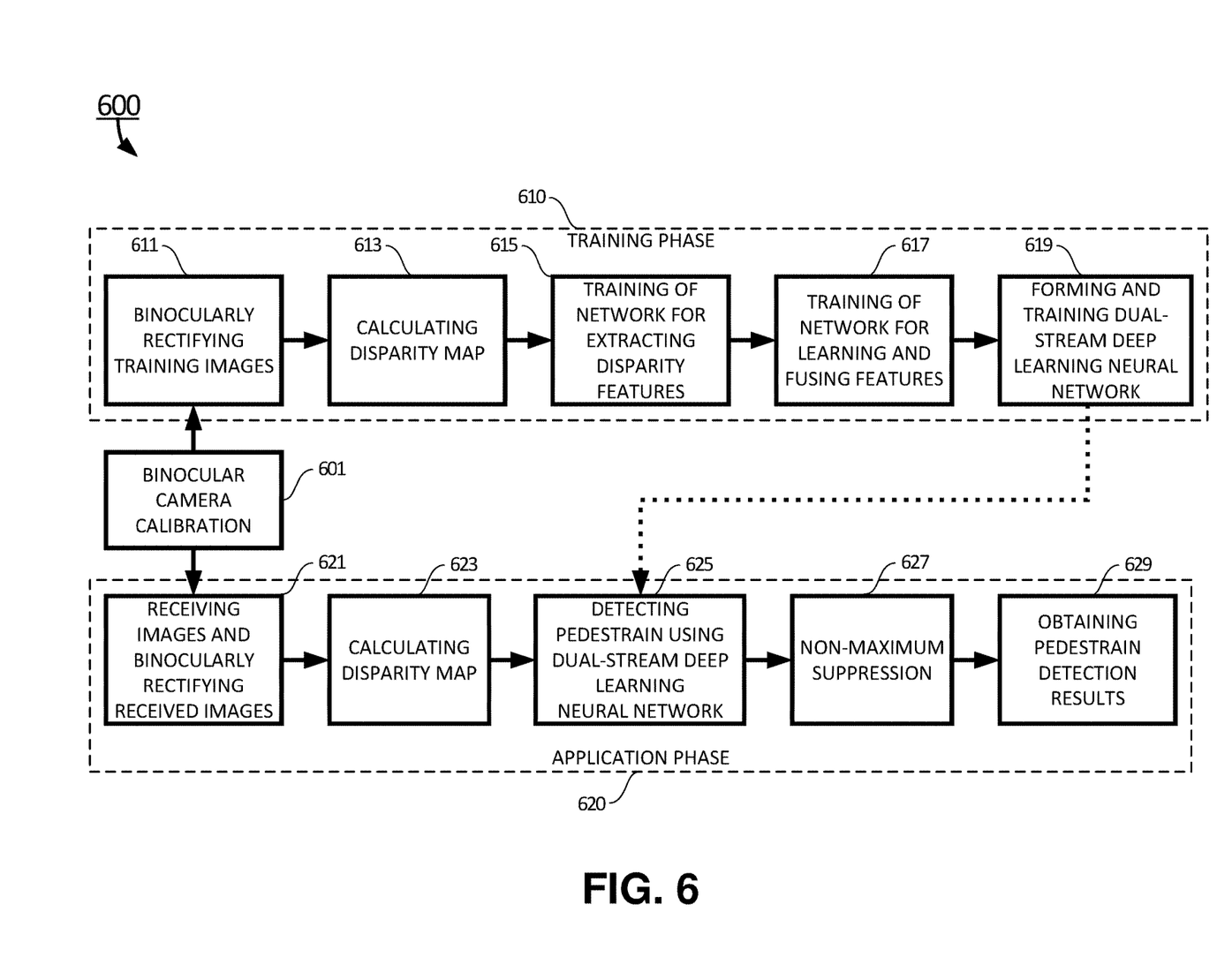
FIG. 6 shows a block diagram of a training phase and an application phase of a dual-stream deep learning neural network according to certain embodiments of the present disclosure.

Referring now to FIG. 6, a block diagram of a training phase and an application phase of a dual-stream deep learning neural network is shown according to certain embodiments of the present disclosure. In certain embodiments, the binocular camera 110 may be calibrated to increase the consistency and accuracy of the binocular camera 110 as shown in box 601 of FIG. 6. Binocular camera calibration allows the Binocular camera 110 to shoot a specified size object from different angles, calculates the internal and external parameters of the Binocular camera 110.

In one embodiment, the specific steps of calibration include: (a) making a 12×12 black-and-white checkerboard, using the binocular camera 110 to shoot 15 photos of the checkerboard from different angles. The checkerboard must be present in the view of the first camera 111 and the second camera 112 of the binocular camera 110 simultaneously, and (b) calibration of the camera is performed using the calibration kit toolbox_calib of MATLAB, according to the 15 photos captured above during the calibration. Following parameters of the first camera 111 and the second camera 112 are obtained through calibration:

- a left x direction focal length: $f_x^1$;
- a left y direction focal length: $f_y^1$;
- a right x direction focal length: $f_x^2$;
- a right y direction focal length: $f_y^2$;
- a left camera image center coordinates: $c_x^1$ and $c_y^1$;
- a right camera image center coordinates: $c_x^2$ and $c_y^2$;
- a first camera distortion parameter: $d'_1$;
- a second camera distortion parameter: $d'_2$;
- a rotation matrix between the first camera 111 and the second camera 112: R; and
- a shift vector T.

These camera parameters are used for performing binocular rectification of binocular images of pedestrians captured by the binocular camera 110. In certain embodiments, the binocular camera 110 captures a first image $I_1$ by the first camera 111, and a second image $I_2$ by the second camera 112. These two binocular images $I_1$ and $I_2$ are binocularly rectified by using rectification functions including stereoRectify, initUndistortRectifyMap, and remap, and using the parameters obtained through binocular calibration described above: $f_x^1$, $f_y^1$, $f_x^2$, $f_y^2$, $c_x^1$, $c_y^1$, $c_x^2$, $c_y^2$, $d'_1$, $d'_2$, R, and T.

In certain embodiments, the functions used include:

stereoRectify(M1, D1, M2, D2, imageSize, R, T, R1, R2, P1, P2, Q, CALIB_ZERO_DISPARITY, 0, imageSize, &ValidRoi1, &ValidRoi2);
innUndistortRectifyMap(M1, D1, R1, P1, imageSize, CV_16SC2, rmap[0][0], rmap[0][1]);
initUndistortRectifyMap(M2, D2, R2, P2, imageSize, CV_16SC2, rmap[1][0], rmap[1][1]);

where, $M1 = \begin{bmatrix} f_x^1 & 0 & c_x^1 \\ 0 & f_y^1 & c_y^1 \\ 0 & 0 & 1 \end{bmatrix}$, $M2 = \begin{bmatrix} f_x^2 & 0 & c_x^2 \\ 0 & f_y^2 & c_y^2 \\ 0 & 0 & 1 \end{bmatrix}$, D1=$d'_1$,
D2=$d'_2$,
imageSize is the size of the images $I_1$, and $I_2$, and
R1, R2, P1, P2, Q, ValidRoi1, ValidRoi2, rmap are the output variables.
remap(left_src, left_dst, rmap[0][0], rmap[0][1], INTER_LINEAR);
remap(right_src, right_dst, rmap[1][0], rmap[1][1], INTER_LINEAR);
where left_src is the first image $I_1$, right_src is the second image $I_2$, left_dst is the rectified first image $I_1^r$, and right_dst is the rectified second image $I_2^r$.

The rectified binocular images $I_1^r$ and $I_2^r$ may be fed to a training phase 610 and to an application phase 620.

In certain embodiments, the dual-stream deep learning neural network 625 includes a neural network for extracting disparity features from the disparity maps of the binocular images of the pedestrians 303, and a neural network for learning and fusing the features of RGB and disparity from binocular images of pedestrians 303. In certain embodiments, the neural network for learning and fusing features includes M layers, where M is a positive integer and is a total number of layers of the neural network for learning and fusing features.

In certain embodiments, the binocular images of the pedestrians 303 include certain training binocular images of the pedestrians 303 and certain real-time binocular images of the pedestrians 303 captured by the binocular camera 110 for pedestrian detection. The image/video processing ASIC 120 is programmed to perform one or more of operations: performing calibration of the binocular camera 110, binocularly rectifying the binocular images of the pedestrians 303, calculating the disparity maps of training binocular images of the pedestrians 303 during a training phase 610, and calculating the disparity maps of real-time binocular images of the pedestrians 303 during an application phase 620.

In certain embodiments, in the training phase 610, the training binocular images of pedestrians 303 from the binocular camera 110 are directed to box 611 for binocular rectifying the training binocular images of pedestrians 303. The rectified training binocular images of pedestrians 303 are used to calculate disparity maps of these training binocular images of pedestrians 303 in box 613.

The disparity map d of the rectified binocular images $I_1^r$ and $I_2^r$ is generated by using standard Semi-Global Block-Matching (SGBM) Algorithm. Disparity map d is a gray-scaled image with a pixel value of 0-255.

Disparity map d records the amount of deviation for each point on the image, between the first (left) and the second (right) positions. For example, for the position of column j of line i in the first (left) image, $I_1^r(i, j)$, this point is found to appear in the right image, $I_2^r(i, j+\Delta j)$ through a search for a match, then $\Delta j$ is the value of disparity map d (i,j). For an object further away, the position deviation $\Delta j$ of the first image and the second image will be smaller. For a close object, the position deviation $\Delta j$ of the first image and the second image will be greater. Therefore, the disparity map d reflects the relative distance of the object from each of the first camera 111 and the second camera 112 of the binocular camera 110.

In certain embodiments, the calculated disparity maps of the binocular images of pedestrians 303 are then used in box 615 for extracting disparity features of the disparity maps of these training binocular images of pedestrians 303. After the training of the neural network for extracting disparity features, the output of the training of the neural network for extracting disparity features is fed into box 617 to train the neural network for learning and fusing features. Once the neural network for extracting disparity features and the neural network for learning and fusing features are trained, the neural network for extracting disparity features and the neural network for learning and fusing features are combined and used for forming and training of a dual-stream deep learning neural network in box 619. The output of the box 619 forms the dual-stream deep learning neural network 625 to be used for detecting pedestrians 303 in the application phase 620.

Figure 8:
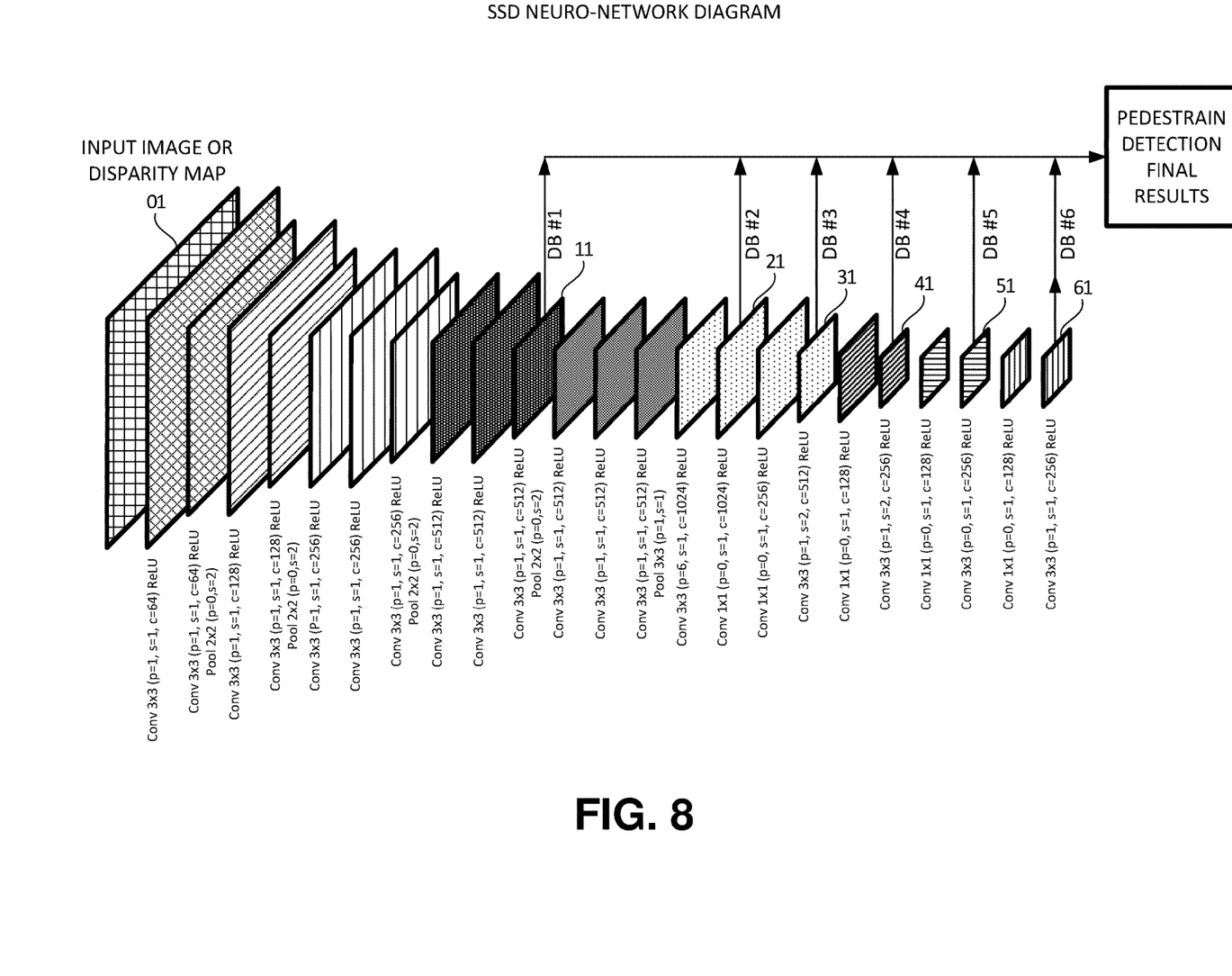
FIG. 8 illustrates a single shot multibox detector (SSD) based neural network using dual-stream deep learning neural network diagram according to certain embodiments of the present disclosure.

In certain embodiments, the architecture of the neural network for extracting disparity features is referring to single shot multibox detector (SSD) as shown in FIG. 8. In one embodiment, the backbone of the SSD consists of 23 layers, each of which includes convolution operations, nonlinear activations, and pooling operations and these operations are performed according to the equations shown in FIG. 8 along each of the 23 layers.

As shown in FIG. 8, these 23 layers are sequentially connected to each other. The nonlinear activation takes the ReLU activation function, defined as $f(x)=\max(0, x)$. The pooling operations are performed with the maximum value (Maximum Pooling), meaning that each pixel is replaced by the maximum value of its neighborhood pixels.

In certain embodiments, cony represents the convolution operation, pool represents the pooling operation, the k×k represents the size of the convolution kernel or the pooling kernel, p represents the number of pixels (pading) of the edge of the feature graph, and s represents the step size (stride) of the convolution kernel, and c represents convolution kernel traversal (channels).

Figure 9:
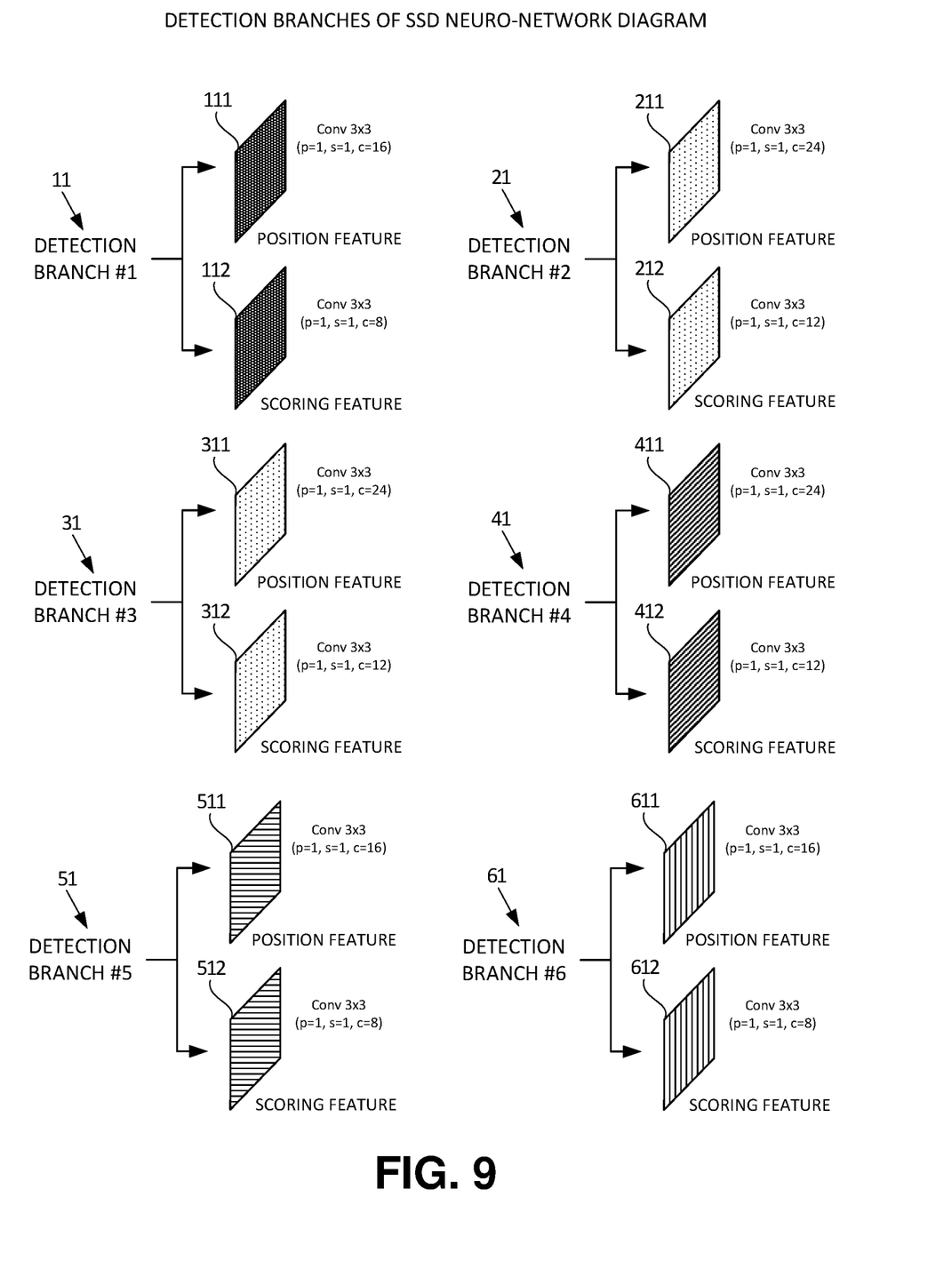
FIG. 9 illustrates certain detection branches from the SSD neural network using dual-stream deep learning neural network diagram shown in FIG. 8 according to certain embodiments of the present disclosure.

In certain embodiments, as shown in FIG. 8, A detection branch 11 (DB #1), a detection branch 21 (DB #2), a detection branch 31 (DB #3), a detection branch 41 (DB #4), a detection branch 51 (DB #5), and a detection branch 61 (DB #6), are formed at $10^{th}$, $15^{th}$, $17^{th}$, $19^{th}$, $21^{st}$, and $23^{rd}$ layers, respectively. Each of the detection branches is formed after two convolution operations. The first convolution results in a pedestrian position feature map, and the second convolution results its corresponding scoring feature map as shown in FIG. 9. The 4*k values for each pixel position (x, y) in the position feature map represent the coordinates of the upper-left corner, length, and width of the k predicted rectangle positions. The 2*k values for each pixel position (x, y) in the scoring feature map represent k predicted scoring corresponding to the "pedestrian" and "background" of k predicted positions. The pedestrian detection results obtained by each of the detection branches DB #1, DB #2, DB #3, DB #4, DB #5, and DB #6 are combined to obtain final pedestrian detection results, as shown in FIG. 8.

In certain embodiments, the number of categories of detection branches in SSD is set to 2, i.e., only the "pedestrian" and "background" categories. A large number N of binocular image frames, $\{I_{i1}, I_{i2}\}_{i=1}^{N}$ are sampled from the binocular video. For training, N is the total number of binocular image frames. After the rectification operations, the rectified binocular images $\{I_{i1}, I_{i2}\}_{i=1}^{N}$ are obtained. After the rectified binocular images $\{I_{i1}, I_{i2}\}_{i=1}^{N}$ are processed and the binocular disparity maps $\{d_i\}_{i=1}^{N}$ of these binocular images $\{I_{i1}, I_{i2}\}_{i=1}^{N}$ are calculated. For each binocular image frame, all pedestrian bounding boxes (bounding box) are manually marked out in the left image. Each bounding box is represented by its coordinates of the upper-left corners, the length and the width.

During training, the binocular disparity maps $\{d_i\}_{i=1}^{N}$ of these binocular images $\{I_{i1}, I_{i2}\}_{i=1}^{N}$ are the inputs to the neural network for extracting disparity features, while the pedestrian bounding box information are the output of the neural network for extracting disparity features. The neural network for extracting disparity features is trained using back propagation and the gradient descent method. At the end of the training, only the first 7 layers of the neural network for extracting disparity features are retained for disparity feature extraction, and the remaining layers are discarded. Finally, when a disparity map is entered, the neural network for extracting disparity features generates a feature map with ⅛ resolution of the original disparity map.

In certain embodiments, the architecture of the neural network for learning and fusing features is also referring to single shot multibox detector (SSD) as shown in FIG. 8 using similar parameters and formulas. In certain embodiments, the number of categories of detection branches in SSD is also set to 2, i.e., only the "pedestrian" and "background" categories. The rectified left image frame $\{I_{i1}\}_{i=1}^{N}$ is the input to the neural network for learning and fusing features, the pedestrian bounding box information in the left image is used as the output of the neural network for learning and fusing features. The neural network for learning and fusing features is also trained by the back propagation and gradient descent method.

Figure 7:
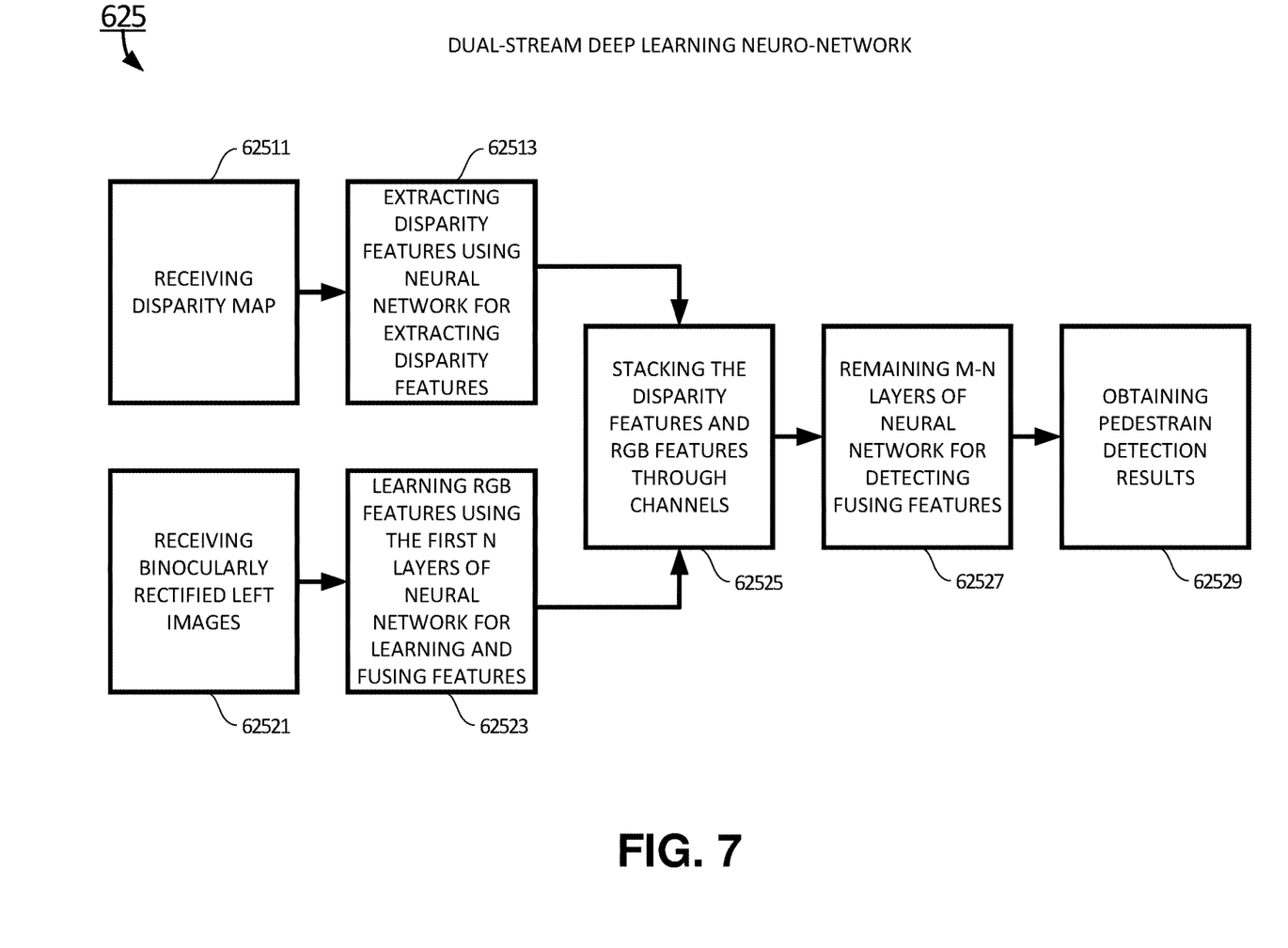
FIG. 7 shows detailed operation of detecting pedestrian using the dual-stream deep learning neural network according to certain embodiments of the present disclosure.

In certain embodiments, as shown in box 619 of FIG. 7, the dual-stream deep learning neural network is formed and trained by combining the disparity features extracted using the neural network for extracting disparity features and RGB features learned by the 7th layer of the neural network for learning and fusing features. These features are concatenated and continued to forward propagation according to subsequent structure of the neural network for learning and fusing features.

In certain embodiments, in the application phase 620, real-time binocular images of pedestrians 303 are received from the calibrated binocular camera 110, and these binocular images of pedestrians 303 are binocularly rectified in box 621. The rectified real-time binocular images of pedestrians 303 are used to calculate disparity maps of these real-time binocular images of pedestrians 303 in box 623. The dual-stream deep learning neural network trained in box 619 is used in box 625 to detect pedestrians 303. The pedestrian detection output from box 625 are used in box 627 to perform non-maximum suppression operation. The final pedestrian detection results are obtained in box 629 after the non-maximum suppression operation is performed on the output of the box 625.

Referring now to FIG. 7, a detailed operation of detecting pedestrian using the dual-stream deep learning neural network is shown according to certain embodiments of the present disclosure. The input binocular images of pedestrians 303 are directed to two separate streams: a first stream and a second stream. The first stream includes box 62511 and box 62513 and this stream is used to extract disparity features of the binocular images of pedestrians 303. The second stream includes box 62521 and box 62523 and this stream is used to learn RGB features of the left images of pedestrians 303. In the first stream, at box 62511, the disparity maps of input binocular images of pedestrians 303 are received. The received disparity maps of binocular images of pedestrians 303 are used in box 62513 to extract disparity features using neural network for extracting disparity features. In the second stream, at box 62521, binocularly rectified left images of pedestrians 303 are received. The received binocularly rectified left images of pedestrians 303 are used in box 62523 to learn RGB features using the first N layers of neural network for learning and fusing features, where N is a positive integer and N<M. In certain embodiments, the extracted disparity features from box 62513 and the learned RGB features from box 62523 are stacked through channels in box 62525. The stacked disparity features and RGB features are sent to the remaining M–N layers of the neural network for learning and fusing features. The final pedestrian detection results are the output of the M-th layer of the neural network for learning and fusing features. In one embodiment, M is 15, and N is 7.

In certain embodiments, the network interface 132 is a power-on-ethernet (POE) network interface. The power supplying to the binocular pedestrian detection system 100 is provided by the POE network interface, and the final pedestrian detection results are transmitted to a server that collects the final pedestrian detection results through the network interface 132 and a communication network 140 as shown in FIG. 1.

In certain embodiments, once the dual-stream deep learning neural network 625 is formed and properly trained, the dual-stream deep learning neural network 625 may be used to detect pedestrians.

In a practical pedestrian detection application, binocular RGB images $I_1, I_2$ are captured by the binocular camera 110. The captured binocular RGB images $I_1, I_2$ are then rectified to obtain the rectified binocular images $I_1^r, I_2^r$. Binocular disparity map d is calculated using the rectified binocular images $I_1^r, I_2^r$. The binocular disparity map d is used by the neural network for extracting disparity features to extract the disparity features, and the rectified left image $I_1^r$ is used by the neural network for learning and fusing features to learn RGB features using the first N layers. The extracted disparity features and the learned RGB features are stacked through channels. The stacked features are then sent to the remaining M−N layers of the neural network for learning and fusing features to get pedestrian detection results. The pedestrian bounding box information $\{B_i^{high\text{-}conf}\}$ (i=1, ..., N) are used as initial pedestrian detection results, where each pedestrian bounding box information contains the coordinates of the upper-left corner, the height, and the width of the pedestrian bounding box, and its detection score.

In certain embodiments, the initial pedestrian detection results are refined using non-maximum suppression operations as shown in box 627 of FIG. 6. In one embodiment, following steps are taken:
(a) initialization step:
   set $\{B_i^{final}\}=\emptyset$, and
   $\{B_i^{temp}\}=\{B_i^{high\text{-}conf}\}$ (i=1, ..., N).
(b) Selecting the pedestrian bounding box with the highest detection score $B_{max}$ from $\{B_i^{temp}\}$, searching from $\{B_i^{temp}\}$ and find all pedestrian bounding boxes having greater than 40% overlap with $B_{max}$ to form $\{B_i^{overlap}\}$ (i=1, ..., n). When $\{B_i^{overlap}\}$ (i=1, ..., n) is empty set, then proceeding to step (d). Otherwise, proceeding to step (c).
(c) removing $\{B_i^{overlap}\}$ from $\{B_i^{temp}\}$;
(d) removing $B_{max}$ from $\{B_i^{temp}\}$, and add $B_{max}$ to $\{B_i^{final}\}$. When $\{B_i^{temP}\}$ (i=1, ..., n) is not an empty set, then proceeding to step (b). Otherwise, proceeding to step (e).
(e) obtaining final pedestrian detection result $\{B_i^{final}\}$ (i=1, ..., K), where K<=N.

In another aspect, the present disclosure relates to a method of detecting pedestrians using a binocular pedestrian detection system 100. In certain embodiments, the method includes: capturing certain binocular images of pedestrians 303 passing through a predetermined area using a binocular camera 110 of the binocular pedestrian detection system 100, binocularly rectifying, via an image/video processing ASIC 120 of the binocular pedestrian detection system 100, the binocular images of the pedestrians 303 captured, calculating, via the image/video processing ASIC 120, disparity maps of the binocular images of the pedestrians 303 binocularly rectified, training a dual-stream deep learning neural network 625 using the rectified left images and disparity maps of the binocular images of the pedestrians 303 calculated, and detecting, via the dual-stream deep learning neural network 625 trained, the pedestrians 303 passing through the predetermined area.

In certain embodiments, the dual-stream deep learning neural network 625 includes a neural network for extracting disparity features from the disparity maps of the binocular images of the pedestrians 303, and a neural network for learning and fusing the features of RGB and disparity from binocular images of pedestrians 303.

In certain embodiments, the binocular pedestrian detection system 100 includes: the binocular camera 110, the image/video processing application specific integrated circuit (ASIC) 120, and a binocular pedestrian detection system controller 130. The binocular camera 110 has a first camera 111, and a second camera 112 to capture certain number of binocular images of pedestrians 303 passing through a predetermined area. The first camera 111 includes a first lens 1111, and a first CMOS sensor 1112 for capturing a left image through the first lens 1111. The second camera 112 includes a second lens 1121, and a second CMOS sensor 1122 for capturing a right image through the second lens 1121. The left image and the right image form a binocular image. The image/video processing ASIC 120 preprocesses the binocular images of the pedestrians 303 captured by the binocular camera 110. The binocular pedestrian detection system controller 130 includes a processor 131, a network interface 132, and a memory 133 storing an operating system 1333, and computer executable instructions 1334. When the computer executable instructions 1334 are executed in the processor 131, the computer executable instructions 1334 cause the processor 131 to perform one or more operations of the method.

In certain embodiments, the binocular images of the pedestrians 303 include certain training binocular images of the pedestrians 303 and certain real-time binocular images of the pedestrians 303 captured by the binocular camera 110 for pedestrian detection. The image/video processing ASIC 120 is programmed to perform:
performing calibration of the binocular camera 110, binocularly rectifying the binocular images of the pedestrians 303, calculating the disparity maps of training binocular images of the pedestrians 303 during a training phase, and calculating the disparity maps of real-time binocular images of the pedestrians 303 during an application phase.

In certain embodiments, the training phase includes: training of the neural network for extracting disparity features using the disparity maps of the binocular images of the pedestrians 303, training of the neural network for learning and fusing the features of RGB and disparity using the left images of pedestrians 303 only, and stacking the trained neural network for extracting disparity features and the neural network for learning and fusing features to form the dual-stream deep learning neural network 625.

In certain embodiments, the application phase includes: capturing, by the binocular camera 110, the real-time binocular images of the pedestrians 303, binocularly rectifying, by the image/video processing ASIC 120, the real-time binocular images of the pedestrians 303 captured, calculating, by the image/video processing ASIC 120, disparity maps of the real-time binocular images of the pedestrians 303 binocularly rectified, detecting the pedestrians 303 from the rectified left images and disparity maps of the real-time binocular images of the pedestrians 303 using the dual-stream deep learning neural network 625 formed during the training phase, and performing non-maximum suppression operation to detection results to obtain final pedestrian detection results.

In certain embodiments, the process of detecting pedestrians 303 using the dual-stream deep learning neural network 625 includes: extracting disparity features from the disparity maps of the real-time binocular images of the pedestrians 303 using the neural network for extracting disparity features, learning RGB features from rectified left images of pedestrians 303 using the first N layers of the neural network for learning and fusing the features of RGB and disparity, stacking the disparity features extracted and the RGB features learned through a number of channels, and fusing features of disparity and RGB using the last M−N layers of the neural network for learning and fusing features to obtain the final pedestrian detection results. In certain embodiments, N is a positive integer, and M is a positive integer greater than N and is a total number of layers of the neural network for learning and fusing features. In one embodiment, N is 7, and M is 15.

In one embodiment, the binocular pedestrian detection system 100 is installed over a doorway 301 having binocular camera 110 facing down to the pedestrians 303 passing through the doorway 301. In another embodiment, the binocular pedestrian detection system 100 is installed over a doorway 301 having binocular camera 110 facing the pedestrians 303 passing through the doorway 301 in a predetermined angle.

In certain embodiments, the network interface 132 includes a power-on-ethernet (POE) network interface. The power supplying to the binocular pedestrian detection system 100 is provided by the POE network interface, and the final pedestrian detection results are transmitted to a server that collects the final pedestrian detection results through the network interface 132 and a communication network 140.

The communication network 140 includes: a wireless personal area network (WPAN), a wireless local area network (WLAN), a wireless metropolitan area network (WMAN), a wireless wide area network (WWAN), a cellular network, and a mobile communication network. The WPAN may also include a Wi-Fi network, a Bluetooth network, an infrared network, and a Zigbee network.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A binocular pedestrian detection system, comprising:
a binocular camera having a first camera, and a second camera to capture a plurality of binocular images of a plurality of pedestrians passing through a predetermined area over a predetermined period of time, wherein each binocular image comprises a left image and a right image;
an image/video processing application specific integrated circuit (ASIC) to preprocess the plurality of binocular images of the pedestrians captured by the binocular camera; and
a binocular pedestrian detection system controller, having a processor, a network interface, and a memory storing an operating system, and computer executable instructions, wherein when executed in the processor, the computer executable instructions cause the processor to perform one or more of following:

capturing, by the binocular camera, the plurality of binocular images of the pedestrians passing through the predetermined area over the predetermined period of time;
binocularly rectifying, by the image/video processing ASIC, the plurality of binocular images of the pedestrians captured to obtain a plurality of rectified binocular images, wherein each of the plurality of rectified binocular images comprises a rectified left image and a rectified right image;
calculating, by the image/video processing ASIC, disparity maps of the plurality of rectified binocular images;
training a dual-stream deep learning neural network, wherein the dual-stream deep learning neural network comprises a neural network for extracting disparity features from the disparity maps of the plurality of binocular images of the pedestrians, and a neural network for learning and fusing features from the plurality of rectified left images and disparity maps of the plurality of binocular images of the pedestrians; and
detecting, via the dual-stream deep learning neural network trained, the plurality of pedestrians passing through the predetermined area over the predetermined period of time.

2. The binocular pedestrian detection system of claim 1, wherein the first camera comprises a first lens, and a first CMOS sensor for capturing the left image through the first lens, the second camera comprises a second lens, and a second CMOS sensor for capturing the right image through the second lens, and the left image and the right image form a binocular image.

3. The binocular pedestrian detection system of claim 1, wherein the image/video processing ASIC is programmed to perform one or more of following operations:
performing calibration of the binocular camera;
binocularly rectifying the plurality of binocular images of the pedestrians, wherein the plurality of binocular images of the pedestrians comprises a plurality of training binocular images of the pedestrians and a plurality of real-time binocular images of the pedestrians captured by the binocular camera for pedestrian detection;
calculating the disparity maps of the plurality of training binocular images of the pedestrians during a training phase; and
calculating the disparity maps of the plurality of real-time binocular images of the pedestrians during an application phase.

4. The binocular pedestrian detection system of claim 3, wherein the training phase comprises:
training of the neural network for extracting disparity features using the disparity maps of the plurality of binocular images of the pedestrians;
training of the neural network for learning and fusing the features of RGB and disparity using the plurality of left images of pedestrians; and
stacking the trained neural network for extracting disparity features and the neural network for learning and fusing features to form the dual-stream deep learning neural network.

5. The binocular pedestrian detection system of claim 4, wherein the application phase comprises:
capturing, by the binocular camera, the plurality of real-time binocular images of the pedestrians;

binocularly rectifying, by the image/video processing ASIC, the plurality of real-time binocular images of the pedestrians captured;

calculating, by the image/video processing ASIC, disparity maps of the plurality of real-time binocular images of the pedestrians binocularly rectified;

detecting the plurality of the pedestrians from the plurality of rectified left images and disparity maps of the plurality of real-time binocular images of the pedestrians using the dual-stream deep learning neural network formed during the training phase; and performing non-maximum suppression to detection results to obtain final pedestrian detection results.

6. The binocular pedestrian detection system of claim 5, wherein the detecting the plurality of the pedestrians using the dual-stream deep learning neural network comprises:

extracting disparity features from the disparity maps of the plurality of real-time binocular images of the pedestrians using the neural network for extracting disparity features;

learning RGB features from the plurality of rectified left images of pedestrians using the first N layers of the neural network for learning and fusing the features of RGB and disparity, wherein N is a positive integer;

stacking the disparity features extracted and the RGB features learned through a plurality of channels;

fusing features of disparity and RGB using the last M–N layers of the neural network for learning and fusing features to obtain the final pedestrian detection results, wherein M is a positive integer greater than N and is a total number of layers of the neural network for learning and fusing features.

7. The binocular pedestrian detection system of claim 6, wherein N is 7, and M is 15.

8. The binocular pedestrian detection system of claim 1, wherein the binocular pedestrian detection system is installed over a doorway having binocular camera facing down to the plurality of pedestrians passing through the doorway.

9. The binocular pedestrian detection system of claim 1, wherein the binocular pedestrian detection system is installed over a doorway having binocular camera facing the plurality of pedestrians passing through the doorway in a predetermined angle.

10. The binocular pedestrian detection system of claim 1, wherein the network interface comprises a power-on-ethernet (POE) network interface, wherein the power supplying to the binocular pedestrian detection system is provided by the POE network interface, and the final pedestrian detection results are transmitted to a server that collects the final pedestrian detection results through the network interface and a communication network.

11. A method of detecting pedestrians using a binocular pedestrian detection system, comprising:

capturing, using a binocular camera of the binocular pedestrian detection system, a plurality of binocular images of a plurality of pedestrians passing through a predetermined area over a predetermined period of time, wherein each of the plurality of binocular images comprises a left image and a right image;

binocularly rectifying, via an image/video processing application specific integrated circuit (ASIC) of the binocular pedestrian detection system, the plurality of binocular images of the pedestrians captured to obtain a plurality of rectified binocular images, wherein each of the plurality of rectified binocular images comprises a rectified left image and a rectified right image;

calculating, via the image/video processing ASIC, disparity maps of the plurality of rectified binocular images;

training a dual-stream deep learning neural network using the plurality of rectified left images and disparity maps of the plurality of binocular images of the pedestrians calculated, wherein the dual-stream deep learning neural network comprises a neural network for extracting disparity features from the disparity maps of the plurality of binocular images of the pedestrians, and a neural network for learning and fusing features from the plurality of rectified left images and disparity maps of the plurality of binocular images of the pedestrians; and detecting, via the dual-stream deep learning neural network trained, the plurality of pedestrians passing through the predetermined area over the predetermined period of time.

12. The method of claim 11, wherein the binocular pedestrian detection system comprises:

the binocular camera having a first camera, and a second camera to capture a plurality of binocular images of the plurality of pedestrians passing through the predetermined area over a predetermined period of time, wherein each of the plurality of binocular images comprises a left image captured by the first camera, and a right image captured by the second camera;

the image/video processing ASIC to preprocess the plurality of binocular images of the pedestrians captured by the binocular camera; and a binocular pedestrian detection system controller, having a processor, a network interface, and a memory storing an operating system, and computer executable instructions, wherein when executed in the processor, the computer executable instructions cause the processor to perform one or more operations of the method.

13. The method of claim 12, wherein the network interface comprises a power-on-ethernet (POE) network interface, wherein the power supply to the binocular pedestrian detection system is provided by the POE network interface, and the final pedestrian detection results are transmitted to a server that collects the final pedestrian detection results through the network interface and a communication network.

14. The method of claim 11, wherein the image/video processing ASIC is programmed to perform one or more of following operations:

performing calibration of the binocular camera;

binocularly rectifying the plurality of binocular images of the pedestrians, wherein the plurality of binocular images of the pedestrians comprises a plurality of training binocular images of the pedestrians and a plurality of real-time binocular images of the pedestrians captured by the binocular camera for pedestrian detection;

calculating the disparity maps of the plurality of training binocular images of the pedestrians during a training phase; and calculating the disparity maps of the plurality of real-time binocular images of the pedestrians during an application phase.

15. The method of claim 14, wherein the training phase comprises:

training of the neural network for extracting disparity features using the disparity maps of the plurality of binocular images of the pedestrians;

training of the neural network for learning and fusing the features of RGB and disparity using the plurality of left images of pedestrians; and stacking the trained neural network for extracting disparity features and the neural network for learning and fusing features to form the dual-stream deep learning neural network.

16. The method of claim 15, wherein the application phase comprises:

capturing, by the binocular camera, the plurality of real-time binocular images of the pedestrians;

binocularly rectifying, by the image/video processing ASIC, the plurality of real-time binocular images of the pedestrians captured;

calculating, by the image/video processing ASIC, disparity maps of the plurality of real-time binocular images of the pedestrians binocularly rectified;

detecting the plurality of the pedestrians from the plurality of rectified left images and disparity maps of the plurality of real-time binocular images of the pedestrians using the dual-stream deep learning neural network formed during the training phase; and performing non-maximum suppression to detection results to obtain final pedestrian detection results.

17. The method of claim 16, wherein the detecting the plurality of the pedestrians using the dual-stream deep learning neural network comprises:

extracting disparity features from the disparity maps of the plurality of real-time binocular images of the pedestrians using the neural network for extracting disparity features;

learning RGB features from the plurality of rectified left images of pedestrians using the first N layers of the neural network for learning and fusing the features of RGB and disparity, wherein N is a positive integer;

stacking the disparity features extracted and the RGB features learned through a plurality of channels;

fusing features of disparity and RGB using the last M−N layers of the neural network for learning and fusing features to obtain the final pedestrian detection results, wherein M is a positive integer greater than N and is a total number of layers of the neural network for learning and fusing features.

18. The method of claim 17, wherein N is 7, and M is 15.

19. The method of claim 11, wherein the binocular pedestrian detection system is installed over a doorway having binocular camera facing down to the plurality of pedestrians passing through the doorway.

20. The method of claim 11, wherein the binocular pedestrian detection system is installed over a doorway having binocular camera facing the plurality of pedestrians passing through the doorway in a predetermined angle.

* * * * *